(12) United States Patent
Hutchings et al.

(10) Patent No.: US 9,479,808 B2
(45) Date of Patent: Oct. 25, 2016

(54) PROVIDING PERSONALIZED RECOMMENDATIONS FOR STREAMING OF BROADCAST CONTENT OVER A NETWORK

(71) Applicant: TuneIn, Inc., Palo Alto, CA (US)

(72) Inventors: Thomas Hutchings, Palo Alto, CA (US); Kristin George, Palo Alto, CA (US)

(73) Assignee: TuneIn, Inc., San Francicso, CA (US)

( * ) Notice: Subject to any disclaimer, the term of this patent is extended or adjusted under 35 U.S.C. 154(b) by 78 days.

(21) Appl. No.: 14/214,672

(22) Filed: Mar. 15, 2014

(65) Prior Publication Data

US 2015/0264415 A1 Sep. 17, 2015
US 2016/0029056 A9 Jan. 28, 2016

Related U.S. Application Data

(60) Provisional application No. 61/799,618, filed on Mar. 15, 2013.

(51) Int. Cl.
| | |
|---|---|
| *G06F 3/00* | (2006.01) |
| *H04N 21/25* | (2011.01) |
| *H04N 21/2665* | (2011.01) |
| *H04N 21/235* | (2011.01) |
| *H04N 21/258* | (2011.01) |
| *H04N 21/2668* | (2011.01) |
| *H04N 21/475* | (2011.01) |

(52) U.S. Cl.
CPC ........ *H04N 21/252* (2013.01); *H04N 21/2353* (2013.01); *H04N 21/25891* (2013.01); *H04N 21/2665* (2013.01); *H04N 21/2668* (2013.01); *H04N 21/4756* (2013.01)

(58) Field of Classification Search
CPC ................................................ H04N 21/4755
USPC ................................................................. 725/45
See application file for complete search history.

(56) References Cited

U.S. PATENT DOCUMENTS

| | | | |
|---|---|---|---|
| 7,778,853 B2* | 8/2010 | Sussman | G06Q 10/02 705/37 |
| 2007/0208718 A1* | 9/2007 | Javid | G06F 17/30017 |
| 2010/0115060 A1 | 5/2010 | Julia et al. | |
| 2010/0125884 A1 | 5/2010 | Howcroft | |
| 2010/0180203 A1* | 7/2010 | Tokita | H04L 12/66 715/735 |
| 2012/0191529 A1* | 7/2012 | Lewis | G06Q 30/0242 705/14.41 |
| 2013/0081085 A1* | 3/2013 | Skelton | H04N 21/252 725/46 |
| 2013/0275611 A1* | 10/2013 | Somekh | H04N 21/251 709/231 |
| 2014/0282717 A1 | 9/2014 | Hutchings et al. | |
| 2014/0289000 A1 | 9/2014 | Hutchings et al. | |

OTHER PUBLICATIONS

Non-Final Office Action for U.S. Appl. No. 14/215,040, mailed Feb. 20, 2015, 17 pages.

Notice of Allowance for U.S. Appl. No. 14/215,040, mailed Jul. 22, 2015, 15 pages.

\* cited by examiner

*Primary Examiner* — Olugbenga Idowu
(74) *Attorney, Agent, or Firm* — Kilpatrick Townsend & Stockton LLP (57) ABSTRACT

An approach for facilitating providing personalized recommendations for streaming of broadcast content is provided. Content identifications are obtained for individual sets of broadcast content being streamed separately over the Internet simultaneously by multiple content providers. One or more recommendations of broadcast content is presented to the user based on the user's content preference profile, one or more ambient conditions associated with the user, online social interactions and/or content of the user, and/or other sets of broadcast content being streamed over the Internet.

20 Claims, 6 Drawing Sheets

PROVIDING PERSONALIZED RECOMMENDATIONS FOR STREAMING OF BROADCAST CONTENT OVER A NETWORK

CROSS-REFERENCES TO RELATED APPLICATIONS

This application claims the benefit of U.S. Provisional Application 61/799,618, filed Mar. 15, 2013, and titled "PROVIDING PERSONALIZED RECOMMENDATIONS FOR STREAMING OF BROADCAST CONTENT OVER A NETWORK," the disclosure of which is hereby incorporated by reference in its entirety and for all purposes.

BACKGROUND

This disclosure relates to providing personalized recommendations for streaming of broadcast content over a network.

Systems that provide users with recommendations of on-demand media content are known. Such systems include Netflix®, Pandora®, Time Warner Cable® On Demand, and AT&T U-verse On Demand. On-demand content may include content that is made available to the user, in its entirety, upon request. For example, a set of content available on demand can be accessed at the discretion of the user from start to finish (e.g., at the time they choose). In such systems, recommendations of media content such as songs, movies, or books likely to be selected by a user may be provided to the user based on information related to the user. Such systems may also provide media content recommendations based on user's previous selections of like media content or based on a manifested user preference for the like media content.

Systems that provide media content streamed over the Internet are known. In those systems, media content selected by users may be streamed over the Internet to a user device such as a personal computer or a smartphone. For example, some of those systems may provide music content selectable by individual users (i.e., playlists of songs), and stream the music to one or more computing platforms, such as a smartphone, as selected by the user.

Media content may be provided for a fee, such as a monthly subscription fee, where the user may stream content from a media provider. Alternatively, media content may be provided to users for free, whereby the media content provider may be compensated by playing or displaying advertisements and/or promotional content along with the media content.

BRIEF SUMMARY

One aspect of this disclosure relates to providing users with recommendations of broadcast content, accessible over a network. Broadcast content can be media content, such as audio and/or video content, that is continuously streamed from one or more broadcast content providers, such as radio stations, over the Internet, to be received by users. Broadcast media, in contrast to on-demand content, may be "pushed" to users. That is, the start and stop times of broadcast media may be determined, or programmed, by a content provider hosting a content stream from which users can choose to consume content at the times programmed by the content provider. Broadcast content providers offering free broadcast content may be compensated by providing advertisements and/or promotional supplemental content along with the broadcast content. Recommendations of broadcast content to users, rather than recommendations of content providers and/or streams of broadcast content generally, may enhance the ability of users to find specific content they enjoy in the streams of broadcast content being pushed out by broadcast content providers. This may enhance the user experience for users.

Broadcast content recommendations may be presented to users of a broadcast content streaming service. The broadcast content recommendations may be based on user parameters, content parameters, and/or other parameters. User parameters may represent preferences, inclinations, habits, and/or other proclivities of a user in consuming broadcast content. Content parameters may indicate characteristics and/or aspects of broadcast content being currently consumed by a user, broadcast content available on one or more content streams other than one presently being consumed by the user, and/or other broadcast content.

The system may include one or more servers. The server(s) may be configured to communicate with one or more client computing platforms according to a client/server architecture. The users may access the system via the client computing platforms. Client computing platforms may include, but not be limited to, personal computers, laptops, and/or handheld devices such as smartphones, tablets, and PDAs.

The server(s) may be configured to execute one or more computer program modules to facilitate providing personalized recommendations for streaming of broadcast content. The computer program modules may include one or more of a content identification module, a user module, a current stream module, a broadcast content recommendation module, a recommendation presentation module, and/or other modules. In some implementations, the client computing platforms may be configured to execute one or more computer program modules that are the same as or similar to the computer program modules of the server(s) to facilitate providing personalized recommendations for streaming of broadcast content.

The content identification module may be configured to obtain content identifications for individual sets of broadcast content being streamed separately over the Internet simultaneously by multiple content providers. The sets of content may include, without limitation, songs, albums, talk shows, videos, shows, live events, and/or other sets of content. The identification module may be configured to obtain content identifications from providers of the broadcast content, from the client computing platforms being used to access the content streams, through automatic and/or manual monitoring of the content streams, and/or from other sources. Such content identification may be made based on information taking the form of one or more of a structured feed, or metadata, descriptive of the broadcast content which it accompanies, and/or other information.

The user module may be configured to manage user accounts. In some implementations, the user accounts may include broadcast content preference information indicating broadcast content preferences of the users. The user accounts may comprise a first user account for a first user. The first user account may include broadcast content preference information for the first user. The broadcast content preference information may include one or more of broadcast content preferences defined by the user, include a history of streams of broadcast content previously selected by the user, and other information indicating a broadcast content preference.

The current stream module may be configured to determine the content providers from which users are presently receiving streamed sets of content. Broadcast content providers may be associated with broadcast content having one or more specific genres, or characteristics. For example, a broadcast content provider may be associated with sport radio, and may be specifically associated with a particular sport, such as football or baseball. Determining which of the content providers a user is receiving streamed sets of content from may facilitate determining the user's genre, or content characteristic, preferences.

The broadcast content recommendation module may be configured to determine broadcast content recommendations for the users. In various implementations, the broadcast content recommendations for the users may be based on the sets of content the users are currently receiving, stored content preference information for the users, and other sets of broadcast content that are currently being streamed. For example, a recommendation for the first user at a given point in time may be determined based on the content preference information included in the first user account, a first broadcast content set the first user is receiving at the given point in time, and other sets of broadcast content identified by the content identification module as being streamed over the Internet at the given point in time.

The broadcast content recommendation module may be configured to facilitate replacing the first content set received by the first user with at least one content set of the broadcast content recommendations, upon a selection and/or entry by the first user of the at least one content set of the broadcast content recommendations. In various implementations, the broadcast content recommendation module may be configured to facilitate replacing the first content set received by the first user with at least one content set of the broadcast content recommendations in the absence of a selection and/or entry by the user.

In some implementations the user accounts may comprise an indication of online interactions by the users. For example, the first user account may comprise an indication of social media interactions and/or content of the first user. Social media content of the user may include information about the user, posts by the user, posts by other users associated with the user, and/or other information available about the user, on electronic social media websites and/or applications. The broadcast content recommendation module may be configured to determine broadcast content recommendations for the users based on an indication of social media interactions and/or content associated with the first user. Social media interactions and/or content associated with the first user may indicate one or more second users associated with the first user. The one or more second users may select and/or enter one or more sets of content to be streamed. The broadcast content recommendation module may be configured to determine broadcast content recommendations for the first user based on broadcast content streamed to the second users. For example, the broadcast content recommendation module may be configured to receive an indication that content having a particular set of characteristics is being received by an increased number of users, or trending, and in particular, is being received by users associated with the first user. In response to receiving an indication of content trending, and/or being received by one or more second users associated with the first user, the broadcast content recommendation module may facilitate recommendation of that content to the first user.

The broadcast content recommendation module may be further configured to determine broadcast content recommendations for the users based on a future event associated with the users, such that at least one content set of the broadcast content recommendations for the first user may be associated with a future event that is related to the content preference information included in the first user account. The first user may select and/or enter an indication of a future event. The user account module may store the indication of the future event in a first user account associated with the first user. The future event may be associated with a set of broadcast content to be provided to the user over the Internet at a future time. Alternatively, the future event may be associated with an event that the user plans to attend in-person. The broadcast content recommendation module may be configured to determine broadcast content recommendations of broadcast content associated with the future event. For example, the user account for the first user may have an indication that the first user will attend an upcoming football game. The broadcast content recommendation module may be configured to determine broadcast content recommendations, for the first user, associated with the upcoming football game. Such broadcast content may comprise sport talk radio broadcasts discussing the upcoming football game, content regarding the teams, or individual players slated to participate in the football game, or content regarding other characteristics associated with the football game.

The broadcast content recommendation module may be further configured to determine broadcast content recommendations for users based upon one or more characteristics of a client computing platform associated with the user, such that the broadcast content recommendations are determined that are more efficiently played by the client computing platform associated with the user. For example, a client computing platform associated with the user may have one or more characteristics limiting the amount of data that can be processed over a given period of time. Broadcast content having a smaller size may run more efficiently on such client computing platforms. Alternatively, the client computing platform associated with the user may have one or more characteristics indicating a capability to efficiently process and display high quality video broadcast content.

The broadcast content recommendation module may be configured to determine broadcast content recommendations based upon an indication of the content currently being accessed by users of one or more external resources from the one or more external resources. For example, the broadcast content recommendation module may be configured to determine broadcast content recommendations based on an indication of which music artists are currently being played by users of a local music collection, and based on one or more available streams of broadcast content currently provided by one or more broadcast content providers.

The recommendation presentation module may be configured to facilitate presentation of at least one content set of the broadcast content recommendations, determined for the first user, to the first user. For example, if the preference information indicating broadcast content preferences for a first user indicated that the first user had a preference for broadcast content associated with football, the recommendation presentation module may be configured to present, to the first user, broadcast content having one or more characteristics associated with football.

The recommendation presentation module may be configured to facilitate entry and/or selection by the first user of at least one recommended content set, being at least one content set of the broadcast content recommendations, so that the user receives the selected recommended content set, where the selected recommended content set replaces the first content set received by the first user.

The user module may be configured to modify the first preference profile of the first user in response to the first user selecting the recommended content set to be played. In some implementations the first preference profile of the first user may comprise an indication of a preference for a set of one or more first characteristics or genres. Upon a selection and/or entry by the user of content having a set of one or more second characteristics or genres different from the first set of characteristics or genres, the user module may be configured to modify the first set of characteristics or genres of the first preference profile for the first user. The user module may modify the first preference characteristics of the first preference profile by combining the first set of preference characteristics with the second set of characteristics. In other implementations, the user module may modify first preference profile by replacing the first set of characteristics with the second set of characteristics.

The user module may include a first preference profile for the first user that may indicate that, during a first period, the first user has a preference for content having a third set of characteristics, and during a second period, the first user has a preference for content having a fourth set of characteristics. The user module may be configured to modify the third set of characteristics corresponding to the first period, in response selection and/or entry, by the first user, of content having a fifth set of characteristics during the first period. In some implementations, the user module may be configured to modify the first set of characteristics to include the fifth set of characteristics. In other implementations, the user module may be configured to facilitate replacing the third set of characteristics, corresponding to a first period, with the fifth set of characteristics.

The broadcast content recommendation module may be further configured to determine broadcast content recommendations for the users based on an indication of ambient conditions at the user's location. Ambient conditions may include one or more of the time of day the user is receiving broadcast content, the day of the week, the season at the user's location, the weather at the user's location, and/or other conditions associated with user, the user's location and/or the location for the broadcast content provider. The user accounts may comprise a user preference profile for the users, wherein the user preference profile comprises an indication of a preference for content having one or more characteristics during specified periods, such as the time of day at the user's location, the day of the week, and/or the season at the user's location. The user preference profile may comprise an indication of a preference for content having one or more characteristics depending on the weather conditions at the user's location. The broadcast content recommendation module may obtain information regarding the ambient conditions at the user's location through one or more external resources.

For example, the first user may have a preference for content having a first characteristic during the morning and a preference for content having a second characteristic during the afternoon. In such cases, the broadcast content recommendation module may be configured to determine broadcast content recommendations, associated with a first set of characteristics, for the first user based on the first user preference indicating a preference, in the morning, for content having a first set of characteristics, and upon an indication that it is morning where the first user is located.

The user accounts may comprise an indication of when in a first broadcast content stream a user selected and/or entered a second broadcast content stream. The broadcast content recommendation module may be configured to determine broadcast content recommendations for the first user, based on the indication of when the first broadcast content stream a user selected and/or entered a second broadcast content stream. For example, a first user may replace a first broadcast content stream with a second broadcast content stream at the occurrence of talk radio content, in the first broadcast content stream, ending and being replaced with music radio content, where the second content stream comprises talk radio content. This provides an indication that the first user has a preference for talk radio content compared with music radio content. The broadcast content recommendation module may determine broadcast content recommendations for the first user wherein the characteristics of the broadcast content recommendations have an increased association with talk radio.

As an additional example, a first user may select and/or enter to stream a second broadcast content stream to replace a first broadcast content stream upon an occurrence of a first song. The broadcast content recommendation module may determine broadcast content recommendations for the first user having one or more characteristics that are likely to exclude the first song from being played. The user account module may modify the first user's account to have an indication of a switch in streams at the occurrence of the first song. The broadcast content recommendation module may be configured to determine broadcast content recommendations based on an aggregate of two or more user accounts providing an indication of a high-rate of switch in streams when the first song is played, indicating that the first song is not favored by at least a portion of the users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
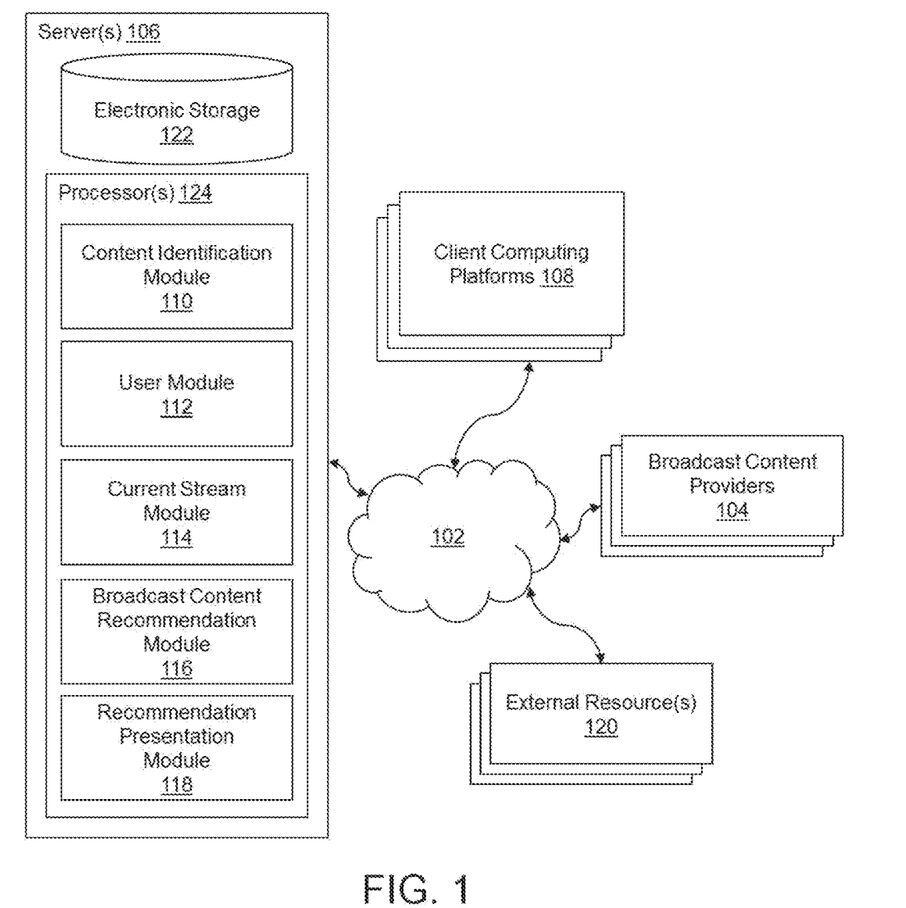
FIG. 1 illustrates a system configured to providing personalized recommendations for streaming of broadcast content over a network, in accordance with one or more implementations.

FIG. 1 illustrates a system 100 configured to provide personalized recommendations of broadcast content for streaming over a network 102. In some implementations, broadcast content may be audio and/or video content made available, by broadcast content providers 104, over a network 102, such as the Internet, and be remotely accessible by users. In various implementations users may access broadcast content for free. In other implementations the broadcast content may be provided to users for a fee, such as a subscription to the broadcast content provided by the broadcast content providers 104.

Broadcast content recommendations may be presented to users of a broadcast content streaming service. The broadcast content recommendations may be based on user parameters, content parameters, and/or other parameters. User parameters may represent preferences, inclinations, habits, and/or other proclivities of a user in consuming broadcast content. Content parameters may indicate characteristics and/or aspects of broadcast content being currently consumed by a user, broadcast content available on one or more content streams other than one presently being consumed by the user, and/or other broadcast content.

The system may include one or more servers 106. The server(s) may be configured to communicate with one or more client computing platforms 108 according to a client/server architecture. The users may access the system 100 via the client computing platforms 108. Client computing platforms may include, but not be limited to, personal computers, laptops, and/or handheld devices such as smartphones, tablets, and PDAs.

The server(s) 106 may be configured to execute one or more computer program modules to facilitate providing personalized recommendations of broadcast content for streaming over a network 102. The computer program modules may include one or more of a content identification module 110, a user module 112, a current stream module 114, a broadcast content recommendation module 116, a recommendation presentation module 118, and/or other modules. In some implementations, the client computing platforms 108 may be configured to execute one or more computer program modules that are the same as or similar to the computer program modules of the server(s) 106 to facilitate providing personalized recommendations of broadcast content for streaming.

Broadcast content providers 104, server(s) 106, client computing platforms 108, and/or external resources 120 may be operatively linked via one or more electronic communication links. For example, such electronic communication links may be established, at least in part, via a network 102 such as the Internet and/or other networks. It will be appreciated that this is not intended to be limiting, and that the scope of this disclosure includes implementations in which broadcast content providers 104, server(s) 106, client computing platforms 108, and/or external resources 120 may be operatively linked via some other communication media. It will also be appreciated that broadcast content providers 104, server(s) 106, client computing platforms 108 and/or external resources 120 may be linked via a single network 102 or multiple networks, and the illustration in FIG. 1 is not intended to be limiting.

A given client computing platform 108 may include one or more processors configured to execute computer program modules. The computer program modules may be configured to enable an expert or user associated with the given client computing platform 108 to interface with system 100, broadcast content providers 104, server(s) 106 and/or external resources 120, and/or provide other functionality attributed herein to client computing platforms 108. By way of non-limiting example, the given client computing platform 108 may include one or more of a desktop computer, a laptop computer, a handheld computer, a tablet computing platform, a NetBook, a Smartphone, a gaming console, and/or other computing platforms.

The external resources 120 may include sources of information, hosts and/or providers of content outside of system 100, external entities participating with system 100, and/or other resources. In some implementations, some or all of the functionality attributed herein to external resources 120 may be provided by resources included in system 100.

Server(s) 106 may include electronic storage 122, one or more processors 124, and/or other components. Server(s) 106 may include communication lines, or ports to enable the exchange of information with a network 102 and/or other computing platforms. Illustration of server(s) 106 in FIG. 1 is not intended to be limiting. Server(s) 106 may include a plurality of hardware, software, and/or firmware components operating together to provide the functionality attributed herein to server(s) 106. For example, server(s) 106 may be implemented by a cloud of computing platforms operating together as server(s) 106.

Electronic storage 122 may comprise electronic storage media that electronically stores information. The electronic storage media of electronic storage 122 may include one or both of system storage that is provided integrally (i.e., substantially non-removable) with server(s) 106 and/or removable storage that is removably connectable to server(s) 106 via, for example, a port (e.g., a USB port, a firewire port, etc.) or a drive (e.g., a disk drive, etc.). Electronic storage 122 may be implemented by a cloud of computing platforms, each having electronic storage, operating together electronic storage 122. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 106, information received from client computing platforms 108, and/or other information that enables server(s) 106 to function as described herein.

Processor(s) 124 may be configured to provide information processing capabilities in server(s) 106. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 110, 112, 114, 116 and 118, and/or other modules by software; hardware; firmware; some combination of software, hardware, and/or firmware; and/or other mechanisms for configuring processing capabilities on processor(s) 124. As noted, in certain implementations, a given client computing platform 108 may include one or more processors that are the same or similar to processor(s) 124 of server(s) 106 to execute such computer program modules of client computing platform(s) 106.

It should be appreciated that although modules 110, 112, 114, 116 and/or 118, are illustrated in FIG. 1 as being co-located within a single processing unit, in implementations in which processor(s) 124 may include multiple processing units, one or more of modules 110, 112, 114, 116, 118, and/or other modules may be located remotely from the other modules. For example, one or more modules may be located and/or executed on one or more of broadcast content providers 104, client computing platforms 108, and/or external resources 120. The description of the functionality provided by the different modules 110, 112, 114, 116, 118, and/or other modules described below is for illustrative purposes, and is not intended to be limiting, as any of modules 110, 112, 114, 116, 118, and/or other modules may provide more or less functionality than is described. For example, one or more of modules 110, 112, 114, 116, 118, and/or other modules may be eliminated, and some or all of its functionality may be provided by other ones of modules 110, 112, 114, 116, 118, and/or other modules. As another example, processor(s) 124 may be configured to execute one or more additional modules that may perform some or all of the functionality attributed below to one of modules 110, 112, 114, 116, 118 and/or other modules.

Content identification module 110 may be configured to obtain content identifications for individual sets of broadcast content, from the client computing platforms being used to access the content streams, through automatic and/or manual monitoring of the content streams, and/or from other sources. The individual sets of broadcast content may be streamed separately over a network 102, such as the Internet, simultaneously by multiple broadcast content providers 104. The sets of content may include, without limitation, songs, albums, talk shows, videos, shows, live events, and/or other sets of content. The content providers 104 may be compensated by charging a fee to users or by advertisers and others wishing to make their goods and services available to users of the system 100. Broadcast content, as described herein, may be audible, video, and/or multimedia streams or programs continuously streamed over a network 102, such as the Internet, and received over the network 102 by a user. The broadcast content being content with which a user can hear, see, and/or interact. Broadcast media, in contrast to on-demand content, may be "pushed" to users. That is, the start and stop times of broadcast media may be determined, or programmed, by a content provider hosting a content stream from which users can choose to consume content at the times programmed by the content provider.

Content identification module 110 may be configured to obtain content identifications from providers 104 of the broadcast content, from the client computing platforms being used to access the content streams, through automatic and/or manual monitoring of content streams, and/or from other sources. Such content identification may be based on information taking the form of one or more of a structured feed, or metadata, descriptive of the broadcast content with which it accompanies, and/or other information. The content identification information may be provided by the content providers 104 over the network 102, along with the broadcast content streamed by the content providers 104.

Content identification information may be provided by external resources 120. The content identification module 110 may be configured to obtain content information associated with the sets of broadcast content being streamed over the network 102, by comparing the sets of broadcast content with information provided by external resources 120.

The user module 112 may be configured to access and/or manage one or more user accounts and/or user information associated with users of the system 100. The one or more user accounts and/or user information may include information stored by server 100 in electronic storage 122, one or more of the client computing platforms 108, external resources 120 and/or other storage locations. The user accounts may include, for example, information identifying users (e.g., a username or handle, a number, an identifier, and/or other identifying information), security login information (e.g., a login code or password), account information, subscription information, relationship information (e.g., information related to relationships between users of the system 100), demographic information associated with users, interaction history among users of the system 100, information stated by users, browsing history of users, a client computing platform identification associated with a user, a phone number associated with a user, and/or other information related to users.

The user accounts may include broadcast content preference information indicating broadcast content preferences and/or user parameters of the users. User parameters may represent preferences, inclinations, habits, and/or other proclivities of a user in consuming broadcast content. The user accounts may comprise a first user account for a first user wherein the first user account may include broadcast content preference information for the first user. The broadcast content preference information may include one or more of broadcast content preferences defined by the user, a history of streams of broadcast content previously selected by the user, inclinations, habits, and/or other information indicating a broadcast content preference.

The current stream module 114 may be configured to determine the broadcast content providers from which 104 users are presently receiving streamed sets of content. Broadcast content providers 104 may be associated with broadcast content having one or more specific characteristics or genres. For example, a broadcast content provider 104 may be associated with talk sport radio, and may be specifically associated with a particular sport, such as football or baseball. Determining which of the content providers 104 a user is receiving streamed sets of content from may facilitate determining the user's genre, or content characteristic, preferences.

The broadcast content recommendation module 116 may be configured to determine broadcast content recommendations for the users. The broadcast content recommendations for the users may be based on the sets of broadcast content that the users are currently receiving, stored content preference information for the users, and other sets of broadcast content that are currently being streamed. For example, a recommendation for the first user at a given point in time may be determined based on the content preference information included in the first user account, a first content set that the first user is receiving at the given point in time, and other sets of broadcast content identified by the content identification module 110 as being streamed over the network 102 at the given point in time.

The broadcast content recommendation module 116 may be configured to facilitate replacing the first content set received by the first user with at least one content set of the broadcast content recommendations, upon a selection and/or entry by the first user of the at least one content set of the broadcast content recommendations.

The broadcast content recommendation module 116 may be configured to determine broadcast content recommendations for users based upon one or more characteristics of a client computing platform 108 associated with the user, such that the broadcast content recommendations are determined that are more efficiently played by the client computing platform 108 associated with the user. For example, a client computing platform 108 associated with the user may have one or more characteristics limiting the amount of data that can be processed over a given period of time. Broadcast content having a smaller size may run more efficiently on such client computing platforms 108. Alternatively, the client computing platform 108 associated with the user may have one or more characteristics indicating a capability to efficiently process and display high quality video broadcast content.

The broadcast content recommendation module 116 may be configured to determine broadcast content recommendations based upon an indication of the content currently being accessed by users of one or more external resources 108 from the one or more external resources 120. For example, the broadcast content recommendation module 116 may be configured to determine broadcast content recommendations based upon an indication of which music artists are currently being played by users of a local music collection, and based upon one or more available streams of broadcast content currently provided by one or more broadcast content providers 104.

The user relationship information stored in the user accounts may comprise an indication of online interactions of the users of the system 100. Such online interactions may be over the network 100, or may be with or through external resources 120. For example, the first user account may comprise an indication of social media interactions of the first user over social media platforms. The social media platforms may be external to the server(s) 106. The broadcast content recommendation module 116 may be configured to determine broadcast content recommendations for the users based on an indication of social media interactions and/or content associated with the first user. For example, social media interactions and/or content associated with the first user may indicate one or more second users associated with the first user. The one or more second users may select and/or enter one or more sets of content to be streamed. The broadcast content recommendation module 116 may be configured to determine broadcast content recommendations for the first user based on broadcast content streamed to the second users, who interact with the first user over social media platforms. The broadcast content recommendation module 116 may be configured to receive an indication that content having a particular set of characteristics is being received by an increased number of users, or trending, and in particular, being received by users associated with the first user. In response to receiving an indication of content trending, and/or being received by users associated with the first user, the broadcast content recommendation module 116 may facilitate recommendation of that content to the first user.

Figure 2:
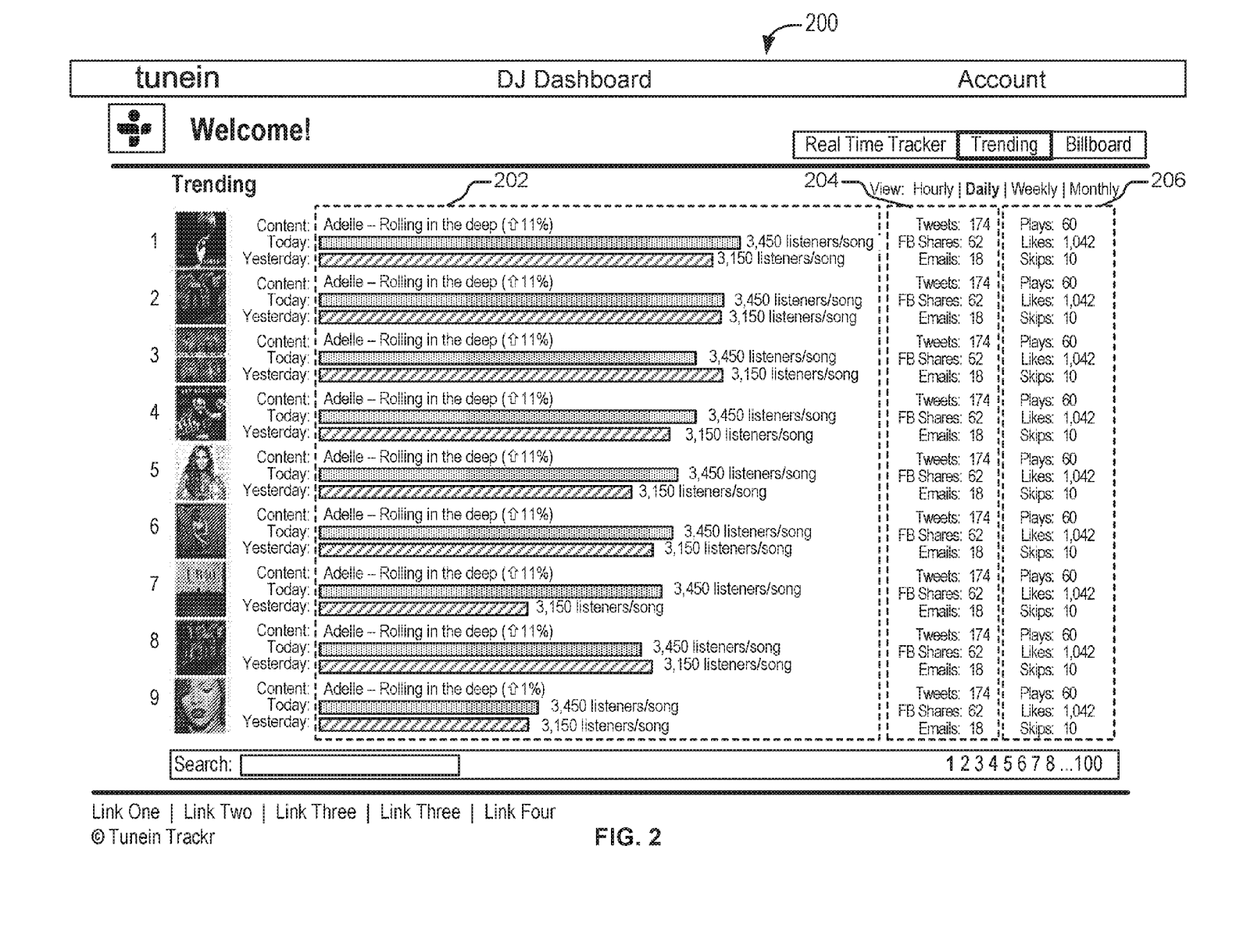
FIG. 2 illustrates an interface displaying information associated with current listening trends, in accordance with one or more implementations.

Referring to FIG. 2, illustrated is an interface 200 displaying information associated with current listening trends or users, in accordance with one or more implementations. The interface 200 may be available to one or more broadcast content providers 104, and may be configured to facilitate streaming of broadcast content. In some implementations, the interface 200 may comprise one or more sets of information corresponding to one or more individual ones of broadcast content.

The interface 200 may comprise trending information 202 comprising information corresponding to a rate of change to the number of times one or more individual ones of broadcast content has been listened to by users of the system 100. Upon an indication that an individual one of broadcast content has been listened to less by users during a second period compared to a first period, the individual one of broadcast content may be demoted in the list of trending information 202. Also, upon an indication that a first individual one of broadcast content has been listened to more by users during a first period compared to other individual ones of broadcast content, the first individual one of broadcast content may be promoted in the list of trending information 202. In response to receiving an indication of the first individual one of broadcast content being promoted in the list of trending information 202, the broadcast content recommendation module 116 may facilitate recommendation of the first individual one of broadcast content to the first user.

The interface 200 may comprise discussion information 204 corresponding to individual ones of broadcast content. Discussion information 204 may illustrate instances where users have discussed individual ones of broadcast content. Users may use, for example, electronic social media to discuss a first individual one of broadcast content. Electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media. Such electronic social media applications may be accessed by the users through one or more client computing platforms 108, the client computing platforms 108 in electronic communication with one or more external resources 120 corresponding to electronic social media applications.

Electronic social media applications may be accessed by users through server(s) 106, such that server(s) 106 facilitate interaction between client computing platform(s) 108 and external resources 120 corresponding to electronic social media applications. The broadcast content recommendation module 116 may be configured to determine recommended broadcast content for users, based on an indication of the frequency that an individual one of a set of broadcast content is being discussed on electronic social media applications.

The broadcast content recommendation module 116 may be configured to determine broadcast content recommendations for the users based on a future event associated with the users, such that at least one content set of the broadcast content recommendations for the first user is associated with a future event that is related to the content preference information included in the first user account. In various implementations, the first user may select and/or enter an indication of a future event. The future event may be associated with a set of broadcast content to be provided to the user over the Internet at a future time. Alternatively, the future event may be associated with an event that the user intends to attend in-person, such as a music event, or sporting event. The broadcast content recommendation module 116 may be configured to determine broadcast content recommendations of broadcast content associated with the future event. For example, the user account for the first user may have an indication that the first user will attend an upcoming football game. The broadcast content recommendation module 116 may be configured to determine broadcast content recommendations, for the first user, associated with the upcoming football game. Such broadcast content may comprise sport talk radio broadcasts discussing the upcoming football game, content regarding the teams, or individual players slated to participate in the football game, or content regarding other characteristics associated with the football game.

The recommendation presentation module 118 may be configured to facilitate presentation of at least one content set of the broadcast content recommendations, determined for the first user, to the first user. For example, in response to a determination by the broadcast content recommendation module 116 of a first set of recommended broadcast content for the first user, the recommendation presentation module 118 may facilitate presentation of the first set of recommended broadcast content to the first user.

Figure 3:
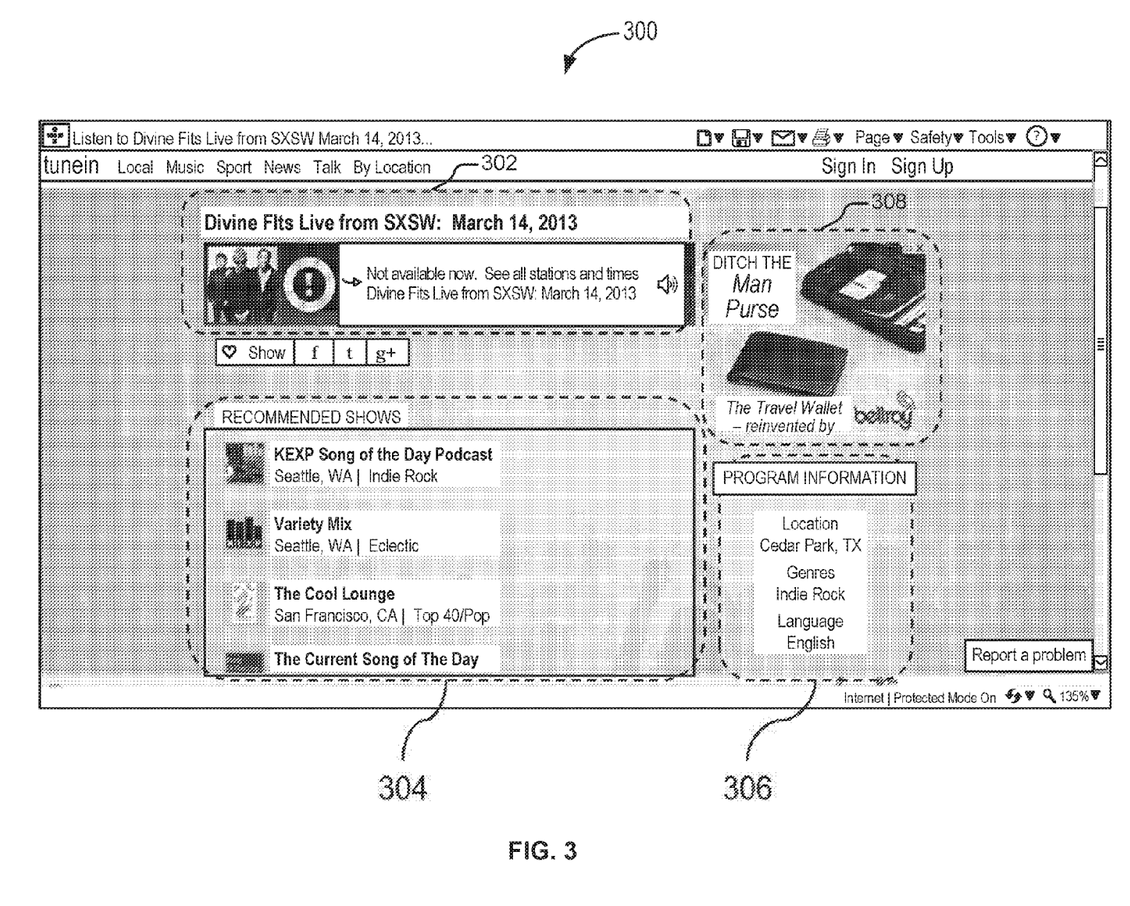
FIG. 3 illustrates a schematic view of a graphical user interface for displaying one or more personalized recommendations for broadcast content, in accordance with one or more implementations.

With reference to FIG. 3, illustrated is a schematic view of a graphical user interface 300 to display one or more personalized recommendations for broadcast content, in accordance with one or more implementations. The graphical user interface 300 may be implemented on one or more of the client computing platforms 108. The graphical user interface 300 may comprise one or more portions. For example, the graphical user interface 300 may comprise portions 302, 304, 306, 308 and/or other portions. It is understood that the graphical user interface 300 may comprise any number of portions, both fewer and more numerous than those illustrated in FIG. 3. The illustration in FIG. 3 is not intended to limit the design and structure of the graphical user interface 300. It is also understood that the portions 302, 304, 306, 308 and/or other portions, may be positioned at any location within the graphical user interface 300, and may take the form of any shape. The portions 302, 304, 306, 308 and/or other portions of the graphical user interface 300 may be configured to perform one or more functions.

For example, portion 302 may be configured to facilitate user control of the broadcast content streaming to the first user. Control portion 302 may facilitate pausing or stopping of the broadcast content stream being received by the first user. Where applicable, the control portion 302 may facilitate rewinding or fast forwarding of the broadcast content stream being received by the first user. In various implementations, the control portion 302 may facilitate moving from a first broadcast content stream to a second broadcast content stream in a playlist comprising multiple broadcast content streams. Such manipulation of the broadcast content stream may be implemented in response to an interaction by the user with one or more areas of the control portion 302.

The recommendation presentation module 118 may be configured to facilitate presentation, to the user, of one or more recommended broadcast content streams as determined by the broadcast content recommendation module 116, via the graphical user interface 300. Recommended broadcast content may be presented in a portion 304 of the graphical user interface 300.

The recommendation presentation module 118 may be configured to facilitate entry and/or selection by the first user of at least one recommended content set, being at least one content set of the broadcast content recommendations, so that the user receives the selected recommended broadcast content set, where the selected recommended broadcast content set replaces the first content set received by the first user. For example, one or more recommended broadcast content sets may be presented to the user in portion 304 of the graphical user interface 300. The graphical user interface 300 may facilitate selection and/or entry of at least one recommended broadcast content set displayed in portion 304, upon an interaction by the user with portion 304. The recommendation presentation module 118 may be configured to facilitate replacing a first broadcast content set being received by a first user, with a selected recommended broadcast content set.

The graphical user interface may comprise one or more portions configured to provide to the user supplemental content. Supplemental content may comprise one or more of advertisements, information, icons, audio and/or video content, purchasable items, and/or other supplemental content to be displayed to the first user. For example, portion 308 of the graphical user interface may be configured to display to a first user one or more advertisements. The one or more advertisements may be selected from a group of advertisements corresponding to one or more user demographics determined from information stored in the user account. Such user demographics may be user preferences selected by the user, prior purchase history of the user, online interactions of the user, location of the user, the weather at the user's location, or any other information related to the user. In various implementations, the one or more advertisements may correspond to the broadcast content set being streamed and delivered to user.

The graphical user interface 300 may comprise one or more portions configured to display information related to the broadcast content stream being delivered to the user. For example, portion 306 may be configured to display information, an icon, or image corresponding to the broadcast content stream currently being delivered to the user. Portion 306 may display, to the user, an identification icon, such as a logo, identifying the broadcast content provider 104 providing the broadcast content stream being delivered to the user.

The user module 112 may be configured to modify the first preference profile of the first user in response to the first user selecting the recommended content set to be played. In some implementations the first preference profile of the first user may comprise an indication of a content characteristic preference, the content characteristic preference comprising a preference for one or more content characteristics. Upon a selection and/or entry by the user of content having one or more characteristics different to that indicated in the content characteristic preference of the first preference profile, the user module 112 may be configured to modify the content characteristic preference of the first preference profile to include an indication of the different genre.

In response to a first user switching between a first content stream to a second content stream upon the occurrence of a first song, the user account module 112 may modify the first user's account to have an indication of a switch in streams at the occurrence of the first song. The broadcast content recommendation module 116 may be configured to determine broadcast content recommendations based on an aggregate of two or more user accounts providing an indication of a high-rate of switch in streams when the first song is played, indicating that the first song is not favored by at least a portion of the users. With reference to FIG. 2, illustrated is information associated with individual ones of broadcast content, in particular songs. Broadcast information group 206 displays information specific to each individual one of broadcast content, such as number of plays of the broadcast content, the number of times users have indicated a preference for the broadcast content, and an indication of the number of times users have skipped and/or switched away from the broadcast content.

The user module 112 may include a first preference profile for the first user indicating that, during a first period, the first user has a preference for content having a first set of characteristics, and during a second period, the first user has a preference for content having a second set of characteristics. The user module 112 may be configured to modify the first set of characteristics corresponding to the first period, in response to selection and/or entry, by the first user, of content having a third set of characteristics during the first period. In some implementations, the user module 112 may be configured to modify the first set of characteristics to include the third set of characteristics. In other implementations, the user module 112 may be configured to facilitate replacing the first set of characteristics, corresponding to a first period, with the third set of characteristics.

The broadcast content recommendation module 116 may be further configured to determine broadcast content recommendations for the users based on an indication of ambient conditions. Ambient conditions may include one or more of the time of day the user is receiving broadcast content, the day of the week, the season at the user's location, the weather at the user's location, and/or other conditions. The user accounts may comprise a user preference profile for the users, such as a first user preference profile for a first user comprising an indication of a first preference for content having one or more characteristics during a specified first period. The first period may correspond to the time of day at the first user's location, the day of the week, the season at the first user's location, and/or any other period.

The user preference profile may comprise an indication of a preference for content having one or more characteristics depending on the weather conditions at the user's location. For example, the first user may have a preference for content having a first set of characteristic during the morning and a preference for content having a second set of characteristics during the afternoon. For example, in such cases, the broadcast content recommendation module 116 may be configured to determine broadcast content recommendations having a first set of characteristics for the first user, based on the first user preference indicating a preference for content having a first set of characteristics in the morning, and upon an indication that it is morning where the first user is located.

The user accounts may comprise an indication of when in a first broadcast content stream a user selected and/or entered a second broadcast content stream. The broadcast content recommendation module 116 may be configured to determine broadcast content recommendations for the first user, based on the indication of when the first broadcast content stream a user selected and/or entered a second broadcast content stream. For example, a first user may replace a first broadcast content stream with a second broadcast content stream at the occurrence, in the first content stream, of talk radio content ending and being replaced with music radio content, where the second content stream comprises talk radio content. This provides an indication that the first user has a preference for talk radio content compared with music radio content.

Figure 4:
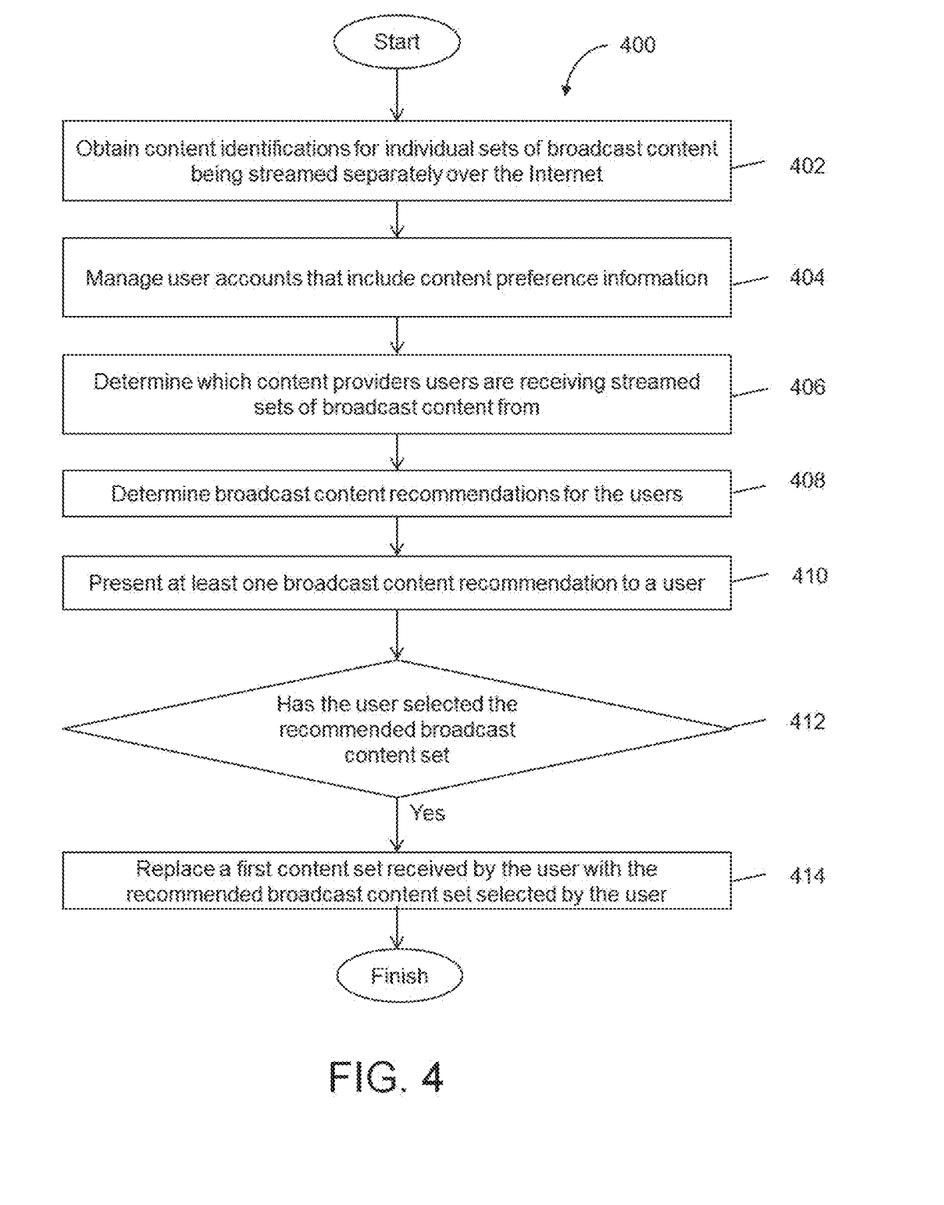
FIG. 4 illustrates a method for providing personalized recommendations for streaming of broadcast content, in accordance with one or more implementations.

FIG. 4 illustrates a method 400 for providing personalized recommendations for streaming of broadcast content, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, one or more content identifications may be obtained for individual sets of broadcast content being streamed separately over the Internet simultaneously by multiple content providers. The sets of content may include, without limitation, songs, albums, talk shows, videos, shows, live events, and/or other sets of content. Content identifications may be obtained from providers 104 of the broadcast content, where the content providers 104 provide content identification information with the broadcast content. In other implementations, content identification may be obtained from server(s) 106 or from external resources 120. The external resource(s) 120, may comprise one or more web-based content management systems to facilitate manual entry of content identification information associated with a particular set of broadcast content or with a particular provider of broadcast content. Operation 402 may be performed by a content identification module that is the same as or similar to content identification module 110, in accordance with one or more implementations.

At an operation 404, user accounts may be managed. The user accounts may include broadcast content preference information indicating content preferences of the users. The user accounts may comprise a first user account for a first user wherein the first user account may include content preference information for the first user. The broadcast content preference information may include one or more of broadcast content preferences defined by the user, may include a history of broadcast content streams previously selected and/or received by the user, and other information indicating a broadcast content preference. Operation 404 may be performed by a user module that is the same as or similar to user module 112, in accordance with one or more implementations.

At an operation 406, a determination of which content providers users are receiving streamed broadcast content from may be made. In some implementations, a determination of one or more characteristics associated with content providers and/or one or more sets broadcast content may be made. Operation 406 may be performed by a current stream module that is the same as or similar to current stream module 114, in accordance with one or more implementations.

At an operation 408, a determination of broadcast content recommendations for the users may be made. The determination of broadcast content recommendation for the users may be made based on the sets of content the users are currently receiving, stored content preference information for the user, and other sets of broadcast content that are currently being streamed. For example, broadcast content recommendations for a first user may be determined for a first user based upon the content preference information included in the first user account, a first content set the first user is receiving at the given point in time, and other sets of broadcast content streaming over the Internet at the given point in time. Operation 408 may be performed by a broadcast content recommendation module that is the same as or similar to broadcast content recommendation module 116, in accordance with one or more implementations.

Broadcast content recommendations may be determined, at an operation 408 for example, for users based upon one or more characteristics of a client computing platform 108 associated with the user, such that the broadcast content recommendations are determined that are more efficiently played by the client computing platform 108 associated with the user.

Broadcast content recommendations may be determined, at an operation 408 for example, based upon an indication of the content currently being accessed by users of one or more external resources 120 from the one or more external resources 120.

At an operation 410, at least one broadcast content recommendation may be presented to users. The at least one broadcast content recommendation determined at an operation 408. The at least one broadcast content recommendation may be presented to the user via an interface accessed and displayed to the user on at least one client computing platform 108. Operation 410 may be performed by a recommendation presentation module that is the same as or similar to recommendation presentation module 118, in accordance with one or more implementations.

At an operation 412, a determination of whether a user has selected the broadcast content recommendation may be made. The graphical interface 200 displayed to the user via client computing platform 108 may be configured to facilitate entry and/or selection by the first user of at least one recommended content set, being at least one content set of the broadcast content recommendations. Operation 412 may be performed by a recommendation presentation module that is the same as or similar to recommendation presentation module 118, in accordance with one or more implementations.

At an operation 414, in response to an indication that the user has selected at least one of set the broadcast content recommendations as determined at the operation 412, a first content set being received by the user may be replaced with the selected broadcast content recommendation. Operation 414 may be performed by a recommendation presentation module that is the same as or similar to recommendation presentation module 118, in accordance with one or more implementations.

Figure 5:
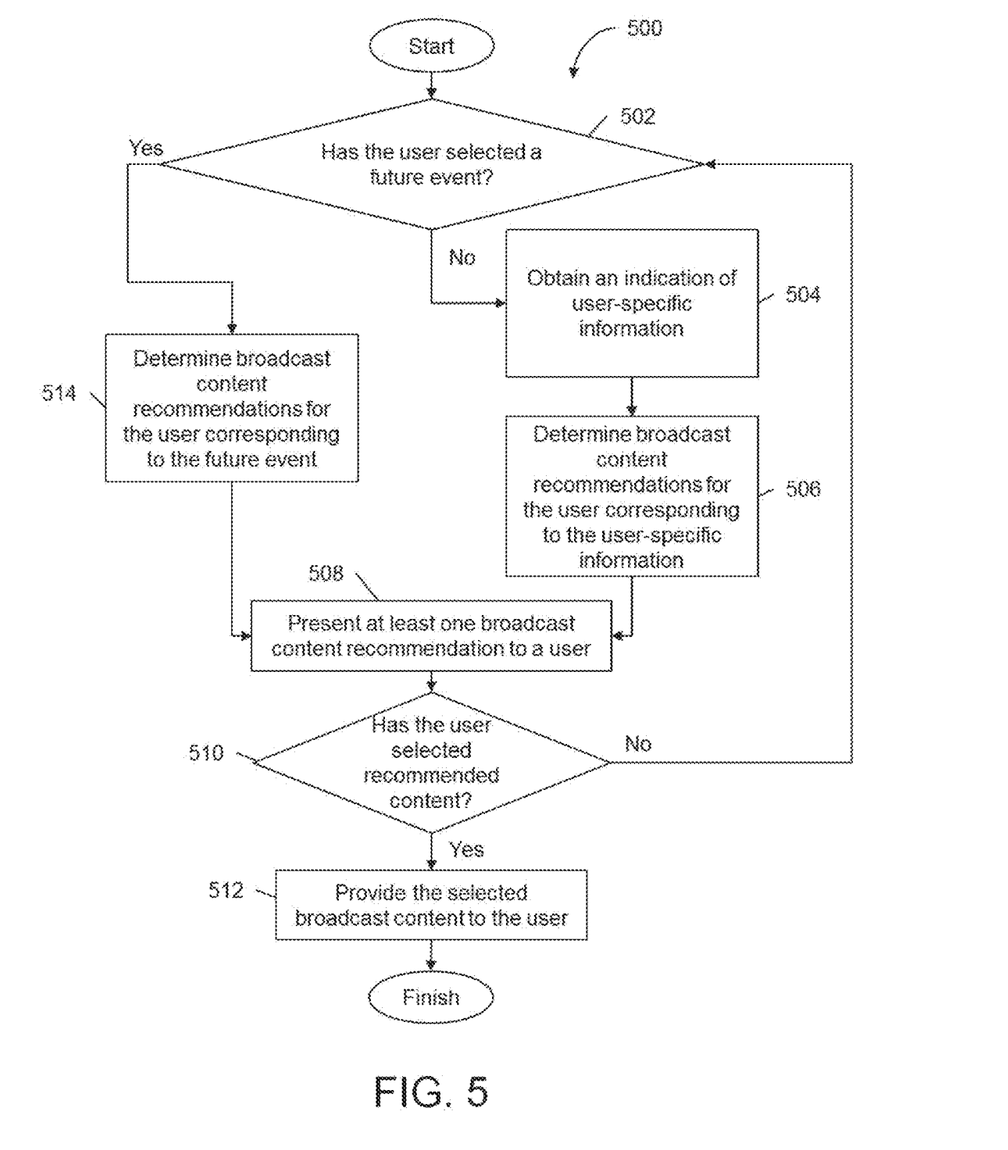
FIG. 5 illustrates a method for providing personalized recommendations for streaming of broadcast content, in accordance with one or more implementations.

FIG. 5 illustrates a method 500 for providing personalized recommendations for streaming of broadcast content, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At an operation 502, whether a user has selected and/or entered a future event may be determined. The future event may be associated with a set of broadcast content to be provided to the user over the Internet at a future time. Alternatively, the future event may be associated with a music event, or sporting event that the user plans to attend. Operation 502 may be performed by a broadcast content recommendation module that is the same as or similar to broadcast content recommendation module 116, in accordance with one or more implementations.

At an operation 504, in response to determining that the user has not selected a future event, an indication of user-specific information may be obtained. Operation 504 may be performed by a broadcast content recommendation module that is the same as or similar to broadcast content recommendation module 116, in accordance with one or more implementations.

User-specific information may include an indication of the ambient conditions at the user's location. The indication of ambient conditions may be obtained from one or more external resources 120. Ambient conditions may include one or more of the time of day the user is receiving broadcast content, the day of the week, the season at the user's location, the weather at the user's location, and/or other conditions. The one or more external resources 120 may be one or more websites providing weather information at a user's location, or may be one or more instruments providing information about ambient conditions at a user's location, the one or more instruments electronically connected to the server(s) 106 by the network 102.

User-specific information may include an indication of the social interactions of a user. Social interactions may include electronic social media interactions of the user on the server(s) 106 or on one or more external resources 120. Social media interactions and/or content associated with a first user may indicate one or more second users associated with the first user. The one or more second users may have selected and/or entered one or more sets of broadcast content to be streamed, providing an indication that the first user may enjoy the one or more sets of broadcast content streamed by the one or more second users.

User-specific information may include broadcast content preference information for the user. Broadcast content preference information may include one or more of broadcast content preferences defined by the user, include a history of broadcast content streams previously selected and/or received by the user, and other information indicating a broadcast content preference.

At an operation 506, broadcast content recommendations for the user may be determined based on the obtained user-specific information. Operation 506 may be performed by a broadcast content recommendation module that is the same as or similar to broadcast content recommendation module 116, in accordance with one or more implementations.

At an operation 508, at least one broadcast content recommendation may be presented to the user. The at least one broadcast content recommendation may be presented in the graphical user interface 300 displayed using one or more client computing platforms 108. Operation 508 may be performed by a recommendation presentation module that is the same as or similar to recommendation presentation module 118, in accordance with one or more implementations.

At an operation 510, a determination of whether the user has selected at least one set of the broadcast content recommendations may be made. The graphical user interface 300 presented, using one or more client computing platforms 108, to the user may facilitate selection and/or entry of the at least one set of broadcast content recommendations by the user. Operation 510 may be performed by a broadcast content recommendation module that is the same as or similar to broadcast content recommendation module 116, in accordance with one or more implementations.

At an operation 512, in response to an indication that the user has selected and/or entered at least one set of the broadcast content recommendations, the at least one set of broadcast content may be provided to the user. The at least one set of recommended broadcast content may be streamed from at least one broadcast content provider 104, through server(s) 106 to client computing platforms 108 over a network 102. In various implementations, the at least one set of recommended broadcast content may be streamed over a network 102 between one or more broadcast content providers 104 and client computing platforms 108.

At an operation 514, in response to an indication that the user has selected and/or entered a future event, broadcast content recommendations for the user, associated with the future event, may be determined. At least one content set of the determined broadcast content recommendations for the user may be associated with a future event. Operation 514 may be performed by a broadcast content recommendation module that is the same as or similar to broadcast content recommendation module 116, in accordance with one or more implementations.

In some implementations, method 500 may also comprise further determining broadcast content recommendations for the user based upon user-specific information. User-specific information may comprise one or more broadcast content preference information for the first user. The broadcast content preference information may include one or more of broadcast content preferences defined by the user, include a history of streams of broadcast content previously selected by the user, and other information indicating a broadcast content preference.

In some implementations, as discussed above, user-specific information may include an indication of the ambient conditions at the user's location. In various implementations, user-specific information may include an indication of the user's online social interactions, connections and/or content. In such implementations, the broadcast content recommendations associated with the future event may also be related to the user-specific information for the user.

Figure 6:
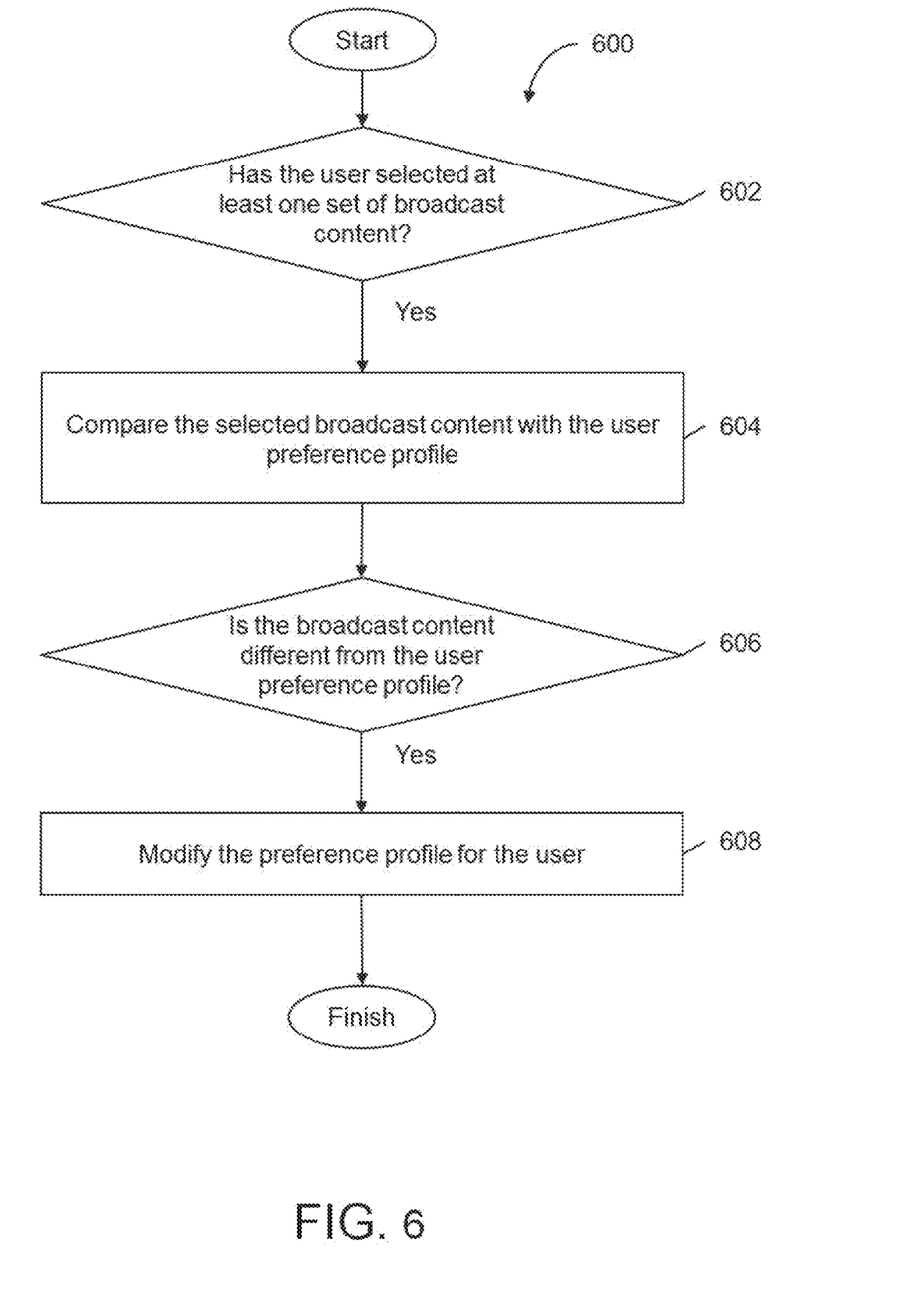
FIG. 6 illustrates a method for modifying a user content preference profile, in accordance with one or more implementations.

FIG. 6 illustrates a method 600 for modifying a user content preference profile, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At an operation 602, a determination of whether the user has selected at least one recommended content set to be played to the user may be made. The graphical user interface 300 presented, using one or more client computing platforms 108, to the user may facilitate selection and/or entry of the at least one set of broadcast content recommendations by the user. Operation 602 may be performed by a broadcast content recommendation module that is the same as or similar to broadcast content recommendation module 116, in accordance with one or more implementations.

At an operation 604, one or more characteristics associated with the selected recommended broadcast content set may be compared with the content preference profile for the user. The selected set of the broadcast content recommendations may have one or more associated categories. Such categories may include the type of content, such as audio, video and/or multimedia content. The broadcast content categories may include one or more of genre, such as talk radio, sport radio, music radio, music television, and/or any other genre. The user content preference profile may include an indication that a user has a preference for a particular type and/or genre of content. The indication of the user's content preference may be determined from one or more of broadcast content preferences defined by the user, include a history of broadcast content streams previously selected and/or received by the user, and other information indicating a broadcast content preference. Operation 604 may be performed by a user module that is the same as or similar to user module 112, in accordance with one or more implementations.

At an operation 606, a determination of whether the one or more characteristics of the selected recommended broadcast content set is different from the one or more characteristics of the content preference profile for the user may be made. Operation 606 may be performed by a user module that is the same as or similar to user module 112, in accordance with one or more implementations.

At an operation 608, in response to a determination that the one or more characteristics of the selected recommended broadcast content set is different from the one or more characteristics of the content preference profile for the user, the content preference profile of the user may be modified. The modification of the preference profile may include replacing the characteristics indicated in the user's content preference profile with the characteristics of the selected broadcast content. In some implementations, the modification of the user's content preference profile may include combining the characteristics of the selected broadcast set with the characteristics of the user's content preference profile. Operation 608 may be performed by a user module that is the same as or similar to user module 112, in accordance with one or more implementations.

As discussed, the user's content preference profile may comprise an indication of a user's preference for content having a first set of characteristics during a first period, and an indication of a user's preference for content having a second set of characteristics during a second period. The modification of the user's content preference profile accounting for differing sets of characteristics preferred during different periods.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system comprising:
one or more processors;
non-transitory computer readable medium coupled to the one or more processors, the computer readable medium encoded with a set of instructions configured to:
receive input corresponding to an identification of a future event, wherein the future event is an event that a user has indicated that the user plans to attend at a future time, and wherein the future event is associated with broadcast content and additional content;

determine an additional content recommendation, wherein the additional content recommendation is based on the additional content associated with the future event, and wherein the additional content is separate from the broadcast content; and facilitate a presentation of the additional content before the occurrence of the future event at the future time, wherein the presentation is facilitated in response to the determination of the additional content recommendation.

2. The system of claim 1, wherein the future event is to be broadcasted over a radio network, and wherein the broadcast content associated with the future event is to be streamed over the Internet by a content provider.

3. The system of claim 2, wherein the set of instructions is further configured to facilitate entry and/or selection by the user of at least one recommended content set, being at least one content set of the additional content recommendation, so that the user receives the selected recommended content set, where the selected recommended content set replaces a current content set received by the first user.

4. The system of claim 3, wherein the set of instructions is further configured to modify a preference profile of the user in response to the user selecting the recommended content set to be played.

5. The system of claim 1, wherein the set of instructions is further configured to facilitate replacing a current content set received by the first user with at least one content set of the additional content recommendation.

6. The system of claim 1, wherein the set of instructions is further configured to determine the additional content recommendation for the user based on an indication of ambient conditions.

7. The system of claim 1, wherein the set of instructions is further configured to determine the additional content recommendation for the user based on an indication of social media interactions and/or content associated with the user.

8. The system of claim 1, wherein the set of instructions is further configured to:
identify one or more broadcast content providers of a set of broadcast content currently being received by the user; and
determine at least one of genre, content characteristic, or preferences associated with the one or more broadcast content providers, wherein the additional content recommendation is determined further based on the determined genre, content characteristics, or preferences associated with the one or more broadcast content providers.

9. The system of claim 1, wherein the set of instructions is further configured to determine broadcast content streamed to one or more other users associated with the user via a social media platform, wherein the additional content recommendation is determined further based on broadcast content streamed to the one or more other users.

10. The system of claim 1, wherein the set of instructions is further configured to determine broadcast content that is trending, wherein the additional content recommendation is determined further based on the determined broadcast content that is trending.

11. A method comprising:
receiving, by a computing device, input corresponding to an identification of a future event, wherein the future event is an event that a user has indicated that the user plans to attend at a future time, and wherein the future event is associated with broadcast content and additional content;
determining an additional content recommendation, wherein the additional content recommendation is based on the additional content associated with the future event, and wherein the additional content is separate from the broadcast content; and
facilitating a presentation of the additional content before the occurrence of the future event at the future time, wherein the presentation is facilitated in response to the determination of the additional content recommendation.

12. The method of claim 11, wherein the future event is to be broadcasted over a radio network, and wherein the broadcast content associated with the future event is to be streamed over the Internet by a content provider.

13. The method of claim 12, further comprising facilitating entry and/or selection by the first user of at least one recommended content set, being at least one content set of the additional content recommendation, so that the user receives the selected recommended content set, where the selected recommended content set replaces a current content set received by the first user.

14. The method of claim 13, further comprising modifying a preference profile of the user in response to the user selecting the recommended content set to be played.

15. The method of claim 11, further comprising replacing a current content set received by the first user with at least one content set of the additional content recommendation.

16. The method of claim 11, further comprising determining the additional content recommendation for the user based on an indication of ambient conditions.

17. The method of claim 11, wherein the further comprising determining the additional content recommendation for the user based on an indication of social media interactions and/or content associated with the user.

18. The method of claim 11, further comprising:
identifying one or more broadcast content providers of a set of broadcast content currently being received by the user; and
determining at least one of genre, content characteristic, or preferences associated with the one or more broadcast content providers, wherein the additional content recommendation is determined further based on the determined genre, content characteristics, or preferences associated with the one or more broadcast content providers.

19. The method of claim 11, further comprising determining broadcast content streamed to one or more other users associated with the user via a social media platform, wherein the additional content recommendation is determined further based on broadcast content streamed to the one or more other users.

20. The method of claim 11, further comprising determining broadcast content that is trending, wherein the additional content recommendation is determined further based on the determined broadcast content that is trending.

* * * * *